Figure 1:
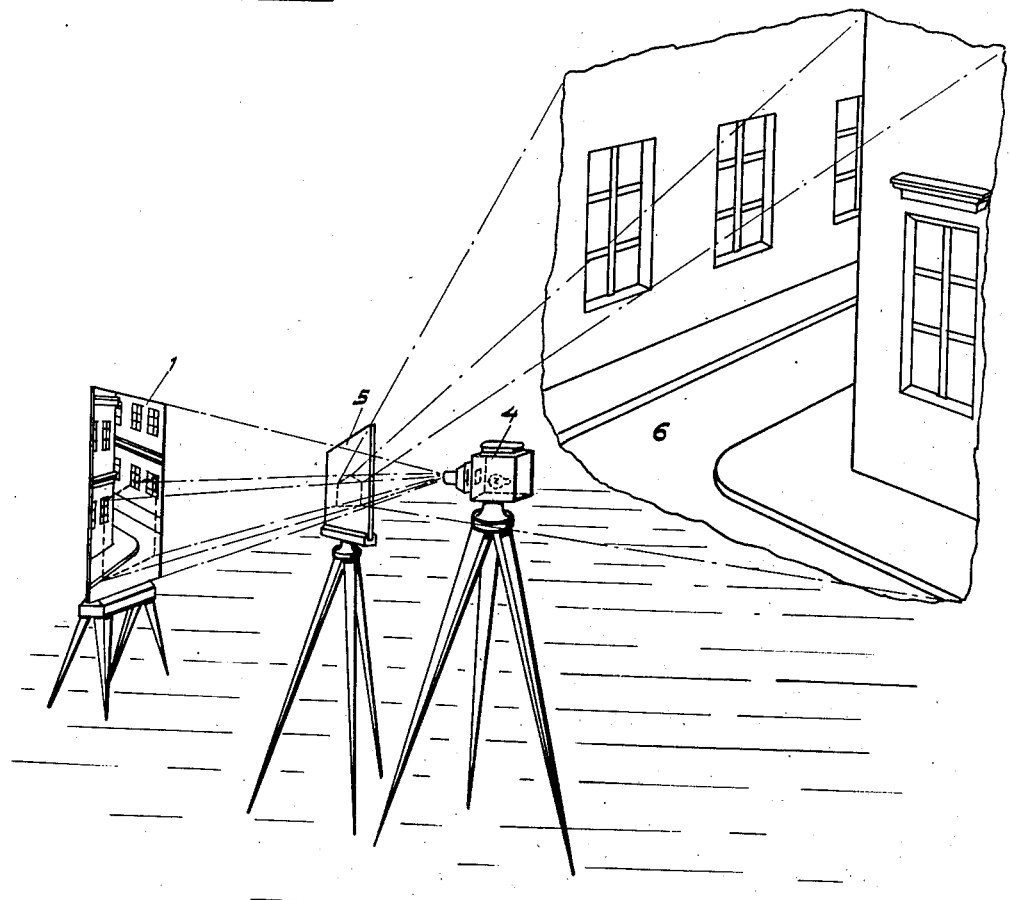

Nov. 9, 1926.  1,606,483

E. SCHÜFFTAN

MAKING MOTION PICTURES

Original Filed Sept. 15, 1923   3 Sheets-Sheet 1

Witnesses

Inventor
Eugen Schüfftan
per:
Attorney

Nov. 9, 1926.  
E. SCHÜFFTAN  
1,606,483  
MAKING MOTION PICTURES  
Original Filed Sept. 15, 1923  3 Sheets-Sheet 2

Nov. 9, 1926.
E. SCHÜFFTAN
1,606,483
MAKING MOTION PICTURES
Original Filed Sept. 15, 1923   3 Sheets-Sheet 3
Fig. 3.
Fig. 4.
Fig. 5.
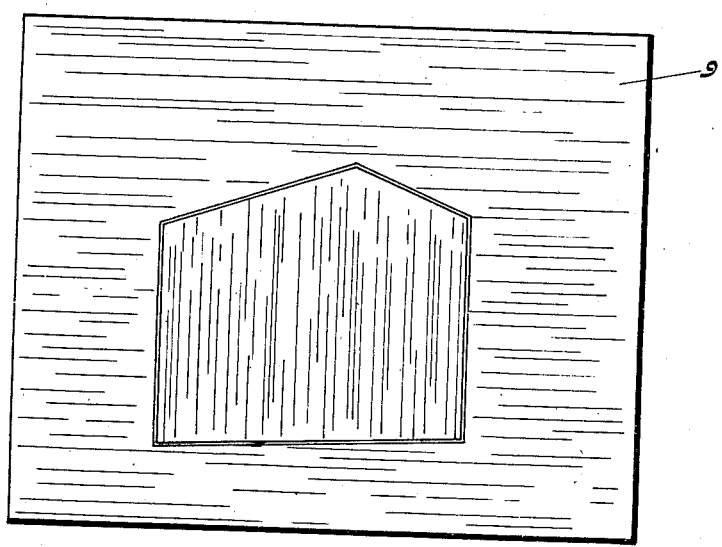
Witnesses
Inventor
Eugen Schüfftan
per.
Attorney

UNITED STATES PATENT OFFICE.

EUGEN SCHÜFFTAN, OF BERLIN-WILMERSDORF, GERMANY.

MAKING MOTION PICTURES.

Original application filed September 15, 1923, Serial No. 663,011, and in Germany September 13, 1922. Divided and this application filed September 5, 1925. Serial No. 54,732.

This invention has reference to the art of making motion pictures from parts of different objects, and of different scales and it is particularly intended to devise means of increasing the exactness and the blending and merging together of the meeting portions of the different parts of the picture. These and other objects and advantages will appear as the specification proceeds. In the production of cinematographic pictures, some parts of the objects are employed of natural size, while complementary portions comprise models, images, diapositives, lantern slides or projections and are united with the other object into a composite picture by means of mirrors. The mounting of the different parts and the proper union thereof is very difficult. In the case of combination photographs in which the different sections of the picture are photographed simultaneously or subsequently it is generally very difficult to fit the various sections exactly together and to produce the impression of a uniform scale in view of the different distance of the objects from the lens of the apparatus. In the case of photographs taken by means of mirrors the fitting and coalescing is rendered particularly difficult by the fact that the shutter and the means of covering up parts of the object or of the mirror are disposed at different angles with relation to each other, and this is particularly true with the combination of covering means with semi-transparent mirrors, that is to say, mirrors provided with a thin transparent mirror coating inasmuch as the mirror is mostly positioned so close to the lens of the camera that it is impossible in sighting to determine the outlines with the required exactness.

In view thereof, and in order to overcome these difficulties my invention proceeds by first obtaining a diapositive of an existing object or of a model of reduced size, and upon this diapositive the separating lines of the different objects, that is to say, of that portion where the action is to take place and that portion without an action are clearly marked. Such diapositive with these separating lines is inserted in the photographic camera or in a projecting apparatus disposed at the same place and is projected by a source of light upon the model, picture, diapositive or the like, or, in the case of photographs, by means of mirrors upon such mirror and consequently upon the shutter, so that the operator is enabled to exactly define and mark the outlines of the portions to be covered up on the model or the like as well as upon the mirror and on the shutter. This projection will have to coincide exactly with the particular portion of the object to be photographed.

After the different portions have been cut out or covered up, the object in natural size will also be executed, so as to correspond exactly to the projection by using light screens on which the outlines and forms of the images become clearly visible. The points at which the screens are to be disposed correspond to the particular points of intersection of the projected image with the floor. The procedure may also be carried out in the reverse order by first obtaining a diapositive of the object of natural size with the separating lines.

In order not to reduce the depth and sharpness of shades, it may become necessary sometimes to separate the photographing of the objects of natural size from the model of reduced size. In this case likewise a picture of the entire foreground and background is projected upon an opaque black piece of paper or the like disposed in front of the semi-transparent mirror, and upon this opaque piece of paper or the like the outlines are then marked, the same as on the diapositives. By cutting out at these points exactly fitting masks are obtained which may be placed in front of the mirror. Thereupon the model is photographed on a reduced scale through the semi-transparent mirror and, while using that portion of the mask obtained as heretofore stated which will cover up the reflecting surface at the point corresponding to the natural object. Then the mirror is covered up by the other portion of the mask so as to only expose that portion of the mirror corresponding to the object of natural size. Upon then covering up the back side of the semi-transparent mirror the action itself may be photographed in front of the object of natural size and upon the partially illuminated film ribbon. By acting in this manner the different pictures will fit together exactly in the film, even in case it should become necessary to change and adjust the lens or the shutter in the camera, in order to obtain a sufficient depth of shade. The procedure last described may also be carried out in the reverse order.

In view of the fact that the masks employed for the covering up of the different sections are mounted at the same point in front of the mirror the exact fitting of the different portions will be insured. The outlines which are marked as separating lines between the two different sections of the picture on the diapositive are preferably made as irregular and broken as possible, so that the complementary portions of the picture will overlap and intersect each other and by this means the result is obtained that the outlines and confines of portions of the tints and shades of which do not exactly agree cannot be recognized.

Figure 2:
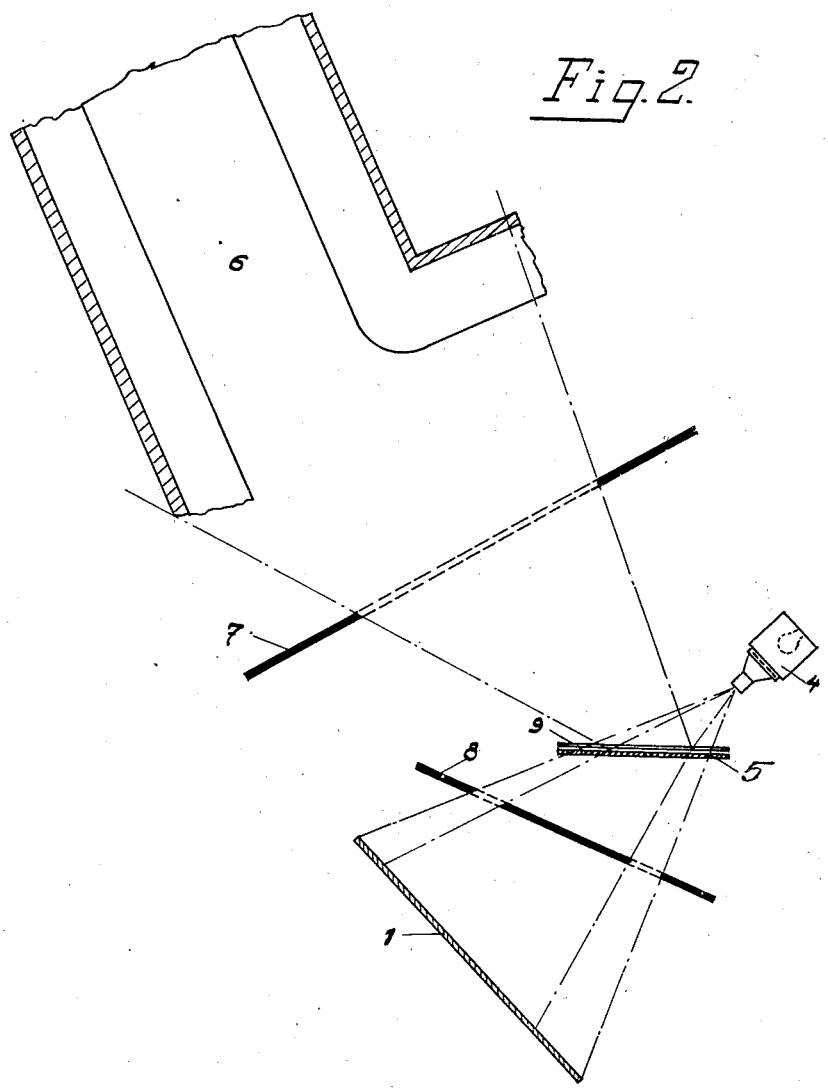

The invention will be further and more particularly described with reference to the accompanying drawings, showing by way of example and in a diagrammatic manner an embodiment of the principles of my invention, but without limiting the invention to this particular arrangement. In Fig. 1 I have shown a perspective view of an arrangement of parts in accordance with the principles of the invention. Fig. 2 is a diagram showing the arrangement with some addition in plan view; Fig. 3 is a diapositive; Fig. 4 is a semi-transparent mirror in longitudinal section and Fig. 5 is a diagram of a mask to be disposed in front or at the rear of the mirror.

A photographic picture is made of the total object or of the picture used in place thereof, as indicated at 1 in Fig. 1 of the drawing and then a diapositive 2 is made thereof, as shown in Fig. 3. Upon this diapositive a marking line 3 is drawn. That portion in the interior thereof, as shown in Fig. 3, may, for instance, be erected as a scenery of natural size in which the actors are to perform. This diapositive is inserted in a projection apparatus 4 which is disposed at exactly the same point at which the photographic camera will have to be placed. Thereupon the object 1 which may be a model, picture, photography or projection picture is so positioned in accordance with the image of the projection apparatus, that it will coincide exactly with such projection. Within the light of vision extending from the projecting apparatus 4 to the object 1 a mirror 5 is mounted as desired and in such a manner that it will contain the entire projection picture of the diapositive 2. This mirror 5 reflects the total picture laterally at an angle of about 55 to 60 degrees (Fig. 2), and at those points at which the projection of the marking line 3 intersects the floor the complemental portions 6 of the scenery are mounted in such a manner that they will fit exactly the projection of the diapositive. Whenever special masks 7 and 8 are necessary, they are inserted in the particular lines of sight and are likewise cut out to correspond with the marking line 3.

When using a mirror with an opaque coating, that portion of the coating which is not required for reflection is removed in accordance with the marking line 3, while, in the case of the employment of a semi-transparent mirror, that portion thereof which should produce a total reflection is provided with a black coating at its rear side. The making of these covers is greatly facilitated in pursuance of this invention by projecting the diapositive upon a black mask 9 (Figs. 4 and 5) mounted on the mirror 5 and then severing the portions of the mask along the marking line 3. The sections of the mask thus obtained will fit exactly so that they may be used as desired. The inner portion thereof is employed as a means of covering the mirror at its back side, in order to obtain a satisfactory reflection of the object 6 when the picture is taken, while the remaining portion is employed in order to cover the mirror at its front side, in case only the object 6 is to be photographed.

When the objects 1 and 6 are to be photographed in succession and separately, the portions of the mask may be alternately used.

It should be understood that the mode of procedure and arrangement of parts herein shown and described is not to be regarded as a limitation of the invention and that it is susceptible of modifications and changes, without deviating from the scope and spirit thereof as defined in the appended claims.

I claim:—

1. The art of making composite motion pictures of a set or scene and a second set or scene complementary to the first set or scene, which comprises making a diapositive of the total set or scene forming the composite picture of the two sets or scenes, roughly outlining on said diapositive the periphery of the second set or scene thus dividing the diapositive into two sections, projecting the diapositive on the first set or scene and causing said first set or scene to register with the projection of the diapositive, arranging a transparent member having a reflecting surface facing a projection camera, and at an acute angle to the axis of the projection camera, registering on the reflecting surface by markings the outlines of the sections of the projected diapositive, removing a portion of the reflecting surface to provide a window in the transparent member which corresponds to one of the sections, the remaining section of the transparent member masking a portion of the first set or scene and reflecting the complementary section of the diapositive, erecting the second set or scene at a point in the reflected light cone where the second set or scene will appear at proper scale with respect to the scale of the other set or scene, then photographing the complementary set or scene by reflection and the first set or scene directly through the window by a camera located at the same point where the projection camera was located.

2. The art of making composite motion pictures of a set or scene and a complementary set or scene which comprises making a diapositive of the total set or scene which includes the two sets or scenes, roughly outlining on said diapositive the complementary set or scene, thus dividing the diapositive into two sections, projecting the diapositive on the first set or scene and causing said set or scene to register in the light cone of the projected image of the diapositive, arranging a mask including a reflecting surface between the first set or scene and a projection camera so that the diapositive will be projected on the mask, roughly outlining the image complementary set or scene as depicted by the projected diapositive on the mask, removing the section of the mask which corresponds to the first set or sceene, photographing the complementary set or scene by reflection and the first set or scene directly.

3. The art of making composite motion pictures of a set or scene and a complementary set or scene which comprises making a diapositive of the total set or scene which includes the two sets or scenes, roughly outlining on said diapositive the complementary set or scene, thus dividing the diapositive into two sections, projecting the diapositive on the first set or scene and causing positive on the first set or scene and causing said set or scene to register in the light cone of the projected image of the diapositive, arranging a mask including a reflecting surface between the first set or scene and a projection camera so that the diapositive will be projected on the mask, roughly outlining the complementary set or scene as depicted by the projection on the mask and removing the section of the mask which corresponds to the first set or scene, reflecting the remaining portion of the diapositive which corresponds to the complementary set or scene, erecting a bodily representation at a point in the reflected light cone where the second set or scene will appear at proper scale with respect to the scale of the other scene, photographing directly the first set or scene and the complementary set or scene by reflection.

4. The art of making composite motion pictures of a set or scene and a complementary set or scene which comprises making a diapositive of the total set or scene which includes the two sets or scenes, roughly outlining on said diapositive the complementary set or scene, thus dividing the diapositive into two sections, projecting the diapositive on the first set or scene and causing said set or scene to register in the light cone of the projected image of the diapositive, arranging a transparent member having a reflecting surface covering the same and facing a projection camera so that the projected diapositive will exactly fit the reflecting surface, removing a portion of the reflecting surface which is covered by a section of the projected image corresponding to a part of the first mentioned set or scene to provide a sight window, reflecting the remaining section of the diapositive at an angle to the axis of the projection camera, erecting a bodily representation of the complementary set or scene at a point in the reflected light cone where the second set or scene will appear at proper scale with respect to the scale of the other set or scene, then photographing one of the sets or scenes directly through the window and the other set or scene by a camera located at the same point where the projection camera was located.

5 The art of making composite motion pictures of a set or scene and a complementary set or scene which comprises making a diapositive of the total set or scene which includes the two sets or scenes, roughly outlining on said diapositive the complementary set or scenes thus dividing the diapositive into two sections, projecting the diapositive on the first set or scene and causing such set or scene to register in the light cone of the projected image of the diapositive, arranging a mask and at the same time a reflecting surface between the first set or scene and a projection camera so that the diapositive will be projected on the mask, roughly outlining the complementary set or scene as depicted by the projection on the mask so that a portion of the image will extend beyond the outlines on the mask, removing the section of the mask which corresponds to the first set or scene, photographing the complementary set or scene by reflection while directly photographing the first set or scene.

6. A step in the art of making composite motion pictures of a set or scene and a complementary set or scene which comprises making a diapositive of the total set or scene which includes the two sets or scenes, roughly outlining on said diapositive the complementary set or scene thus dividing the diapositive into two sections, projecting the diapositive on the first set or scene and arranging said set or scene so that said set or scene will register in the light cone of the projected image of the diapositive, arranging a mask including a reflecting surface between the first set or scene and a projection camera, so that the diapositive will be projected on the mask, roughly outlining the image of the complementary set or scene on the mask as depicted by the projection so that the edges of the image will project beyond the outlines, and then removing the section of the mask which corresponds to the first set or scene.

7. The art of making composite motion pictures of a set or scene and a complementary set or scene which comprises making a diapositive of the total set or scene including the two sets or scenes, roughly outlining on said diapositive the complementary set or scene, thus dividing the diapositive into two sections, projecting the diapositive on the first set or scene, arranging said set or scene so that said set or scene will register with the light cone of the projected image of the diapositive, arranging a mask between the first set or scene and a projection camera from which the diapositive was projected so that the diapositive will be projected on the mask, roughly outlining the complementary set or scene on the mask as depicted by the projection with the projected image extending beyond the outlines, removing the section of the mask which corresponds to the first set or scene to provide a window through which the first set or scene may be directly photographed, reflecting an image of the complementary set or scene at an angle to the light rays from the projection camera, erecting the complementary set or scene at a point in the reflected light cone where the complementary set or scene will appear at proper scale with respect to the scale of the other set or scene, then photographing the complementary set or scene by reflection and the other set or scene directly through the window in the mask by a camera located at the same point where the projection camera was located.

8. The art of making composite motion pictures of a plurality of sets or scenes which comprises making a diapositive of the total set or scene which includes the sets or scenes, providing an irregular line by markings on said diapositive, thus dividing the diapositive into two sections, projecting from a predetermined point the diapositive on one of the sets or scenes and causing said set or scene to register with the projection of the diapositive, arranging a transparent member having a reflecting surface with the reflecting surface facing a projection camera and between the first set or scene and the projection camera so that an image of the diapositive will be formed on the reflecting surface, registering on the reflecting surface by irregular markings the outlines of the sections of the projection, removing a portion of the reflecting surface which corresponds to the set or scene in direct line with the projection camera to provide a sight window in the transparent member through which said set or scene may be photographed, the remaining section of the reflecting surface masking a portion of said set or scene while reflecting the light rays of the second section of the diapositive which corresponds to a second set or scene at an angle to the axis of the projection camera, erecting a screen at a predetermined point in the light cone of the reflected image where the second set or scene will appear at the proper scale relating to the scale of the other set or scene, erecting a bodily representation of the reflected complementary image at said point in the light cone, and photographing the erected complementary set or scene by reflection and the other set or scene directly from the same point where the projection camera was located.

9. A step in the art of making composite motion pictures of a plurality of sets or scenes which comprise making a diapositive of the total set or scene which includes the sets or scenes, providing an irregular line by markings on said diapositive thus dividing the diapositive into two sections, projecting at a predetermined point light rays through the diapositive by a projection camera, arranging a mask in the unsharp zone of the light rays and across said rays so that an image of the diapositive will be formed on the mask, removing one section of the mask to provide a sight window therethrough with the the light rays in the window being projected beyond the mask, and erecting a set or scene at a point in the light rays which project beyond the mask and where said scene will be in focus in a photographic camera located at the same point where the projection camera is located.

10. A step in the art of making composite motion pictures of a plurality of sets or scenes which comprise making a diapositive of the total set or scene which includes the sets or scenes providing an irregular line by markings on said diapositive, thus dividing the diapositive into two sections, arranging a projection camera at a predetermined point and projecting the diapositive from the camera, arranging a reflecting surface across the light rays and in the unsharp zone of the light rays from the projection camera, so that an image of the diapositive will be formed on the reflecting surface, removing a portion of the reflecting surface which corresponds to one of the sections so that the light rays of the projected image will be separated into two parts, with one part of the light rays being reflected at an angle to the axis of the projection camera, while the remaining portion of the light rays will be projected beyond the reflecting surface, and erecting a set or scene at a point in the light rays which are projected beyond the mirror, and a set or scene in the reflected light rays, the sets or scenes being erected at a point in both of the separated light rays where the image of said scenes will appear to scale in a photographc camera located at a point where the projection camera is located.

EUGEN SCHÜFFTAN.